United States Patent
Jaramillo de Echeverri

(10) Patent No.: US 9,908,685 B2
(45) Date of Patent: Mar. 6, 2018

(54) BIODEGRADABLE MOLDED PRODUCT

(71) Applicant: Carmenza Jaramillo de Echeverri, Caldas (CO)

(72) Inventor: Carmenza Jaramillo de Echeverri, Caldas (CO)

(*) Notice: Subject to any disclaimer, the term of this patent is extended or adjusted under 35 U.S.C. 154(b) by 165 days.

(21) Appl. No.: 14/316,885

(22) Filed: Jun. 27, 2014

(65) Prior Publication Data

US 2015/0375919 A1   Dec. 31, 2015

(51) Int. Cl.
| | |
|---|---|
| *B29C 45/00* | (2006.01) |
| *B65D 81/38* | (2006.01) |
| *A47G 23/06* | (2006.01) |
| *B65D 65/46* | (2006.01) |
| *B65D 25/10* | (2006.01) |
| *A47G 23/02* | (2006.01) |
| *A47G 23/03* | (2006.01) |

(52) U.S. Cl.
CPC ..... *B65D 81/3876* (2013.01); *A47G 23/0216* (2013.01); *A47G 23/03* (2013.01); *A47G 23/06* (2013.01); *B65D 25/108* (2013.01); *B65D 65/466* (2013.01); *A47G 2400/10* (2013.01); *B29C 45/0005* (2013.01); *Y02W 90/13* (2015.05)

(58) Field of Classification Search
CPC ................................................. B29C 45/0005
See application file for complete search history.

(56) References Cited

U.S. PATENT DOCUMENTS

| | | | |
|---|---|---|---|
| 3,177,615 A | 4/1965 | Rowe | |
| 3,828,470 A * | 8/1974 | Stoller | A01G 1/04 47/1.1 |
| 8,313,939 B2 * | 11/2012 | Kalisz | B01F 5/0212 435/174 |
| 2004/0211721 A1 | 10/2004 | Stamets | |
| 2008/0145577 A1 * | 6/2008 | Bayer | A01G 1/046 428/35.6 |
| 2015/0038619 A1 * | 2/2015 | McIntyre | B27N 3/002 524/13 |
| 2015/0366141 A1 * | 12/2015 | Creekmore | A01G 1/046 47/1.1 |

FOREIGN PATENT DOCUMENTS

| | | |
|---|---|---|
| BR | PI 1103781-4 | 7/2013 |
| DE | 102012001682 | 3/2004 |
| KR | 10-2014-0050236 | 4/2014 |
| KR | 20140050236 | * 4/2014 |
| WO | 2014170911 | 10/2014 |

OTHER PUBLICATIONS

Ecovative Design: wiping out polystyrene with fungus and farm waste, by Chris Raymond, Wired magazine, Jan. 23, 2012, pp. 1-9.*
Electronic translation of KR20140050236.*
La utilización de la borra del café como substrata de base para el cultivo de Pleurotus ostreatus, Job, 2004.

* cited by examiner

*Primary Examiner* — Jill Heitbrink

(57) ABSTRACT

A method for producing a recyclable molded product is provided. The method includes injecting a coffee ground amalgam into a mold, injecting the coffee ground amalgam with a mycelium, incubating the molded coffee ground amalgam injected with the mycelium for a period of time, and dehydrating the molded coffee ground amalgam injected with the mycelium at a set temperature.

15 Claims, 6 Drawing Sheets

BIODEGRADABLE MOLDED PRODUCT

BACKGROUND

1. Technical Field

Embodiments of the present invention relate generally to a hot cup insulator and a tray where hot cups of coffee are transported. More particularly, the present invention relates to hot cup insulator or other device produced from recycled coffee ground and other cafeteria residues mixed or alone. The hot cup insulator is an economical and environmentally friendly means of protecting an individual's hand while they hold a disposable cup, such as a paper coffee or hot chocolate cup, containing a hot liquid. The tray assists in the handling of more than one cups of hot coffee.

2. Description of Related Art

Coffee production is a process of converting the raw fruit of the coffee plant into the finished coffee. The cherry has the fruit or pulp removed leaving the seed or bean which is then dried. The coffee bean has an epidermis called silver skin or silver film that may be removed when the coffee bean is husked or may be removed from the coffee bean by polishing the coffee bean. Byproducts from the husking, such as the silver skin, are disposed of or used as fiber.

In order to produce coffee for consumption, the whole coffee bean is ground, also known as milling, to facilitate the brewing process. There are four methods of grinding coffee for brewing: burr-grinding, chopping, pounding, and roller grinding.

Upon completion of the milling process, the coffee is brewed for serving by exposing the ground coffee grounds to heated water for a given period of time in a number of different methods. In order to produce coffee that consistently tastes the same the milling process must produce coffee grounds of a consistent size or coarseness. It is well understood that coffee grounds that are too fine produce a harsh or bitter tasting brew. Conversely, a large or course grind produces weak coffee. Due to the importance of the milled coffee ground, a uniform sized coffee ground is preferred than a mixture of sizes.

Because coffee grounds loose flavor faster than roasted beans because of the greater surface area exposed to oxygen. Thus, the beans themselves are often ground immediately before brewing.

Once the coffee grounds are brewed, the resulting hot liquid is served in a number of ways. In an environment where coffee is server in disposable paper cup an insulator to protect the drinker or holder of the cup from burns may be required. In today's environment most coffee cup insulators are made from corrugated cardboard/paper and the like. Alternative insulators developed by Amron Experimental provide a disposable coffee cup with a heat insulator that "grows" out of the cup and that is activated by the heat from any hot beverage. Corrugated insulator sleeves and paper for tray covers are made up of materials that, while biodegradable, contribute to deforestation and whose production leaves a large carbon footprint.

Currently, the spent grounds are either disposed of in landfills or the spent coffee grounds may be used for hair care or skin care as well as in the gardening. These can also be used as biodiesel fuel.

BRIEF SUMMARY

Aspects of the present disclosure are to address at least the above-mentioned problems and/or disadvantages and to provide at least the advantages described below. Accordingly, an aspect of the present disclosure is to provide a molded product, such a coffee cup sleeve insulator and its transportation tray, from an amalgam of coffee grounds and other cafeteria residues mixed or alone.

In accordance with an aspect of the present disclosure, a method for producing a recyclable molded product is provided. The method includes injecting a coffee ground amalgam into a mold, injecting the coffee ground amalgam with a mycelium, incubating the molded coffee ground amalgam injected with the mycelium for a period of time, and dehydrating the molded coffee ground amalgam injected with the mycelium at a set temperature.

In accordance with another aspect of the present disclosure, a method for producing a biodegradable cup insulator is provided. The method includes collecting coffee grounds as the residue of the coffee brewing process, compacting the coffee grounds to a predetermined density while maintaining a predetermined humidity level, injecting the compacted coffee grounds into a mold in the shape of a portion of an exterior of a cup or tray, inoculating the compacted coffee grounds in the mold with a mycelium, incubating the compacted coffee grounds in the mold inoculated with the mycelium for a predetermined period of time, and dehydrating the compacted coffee grounds in the mold inoculated with the mycelium at a predetermined temperature.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
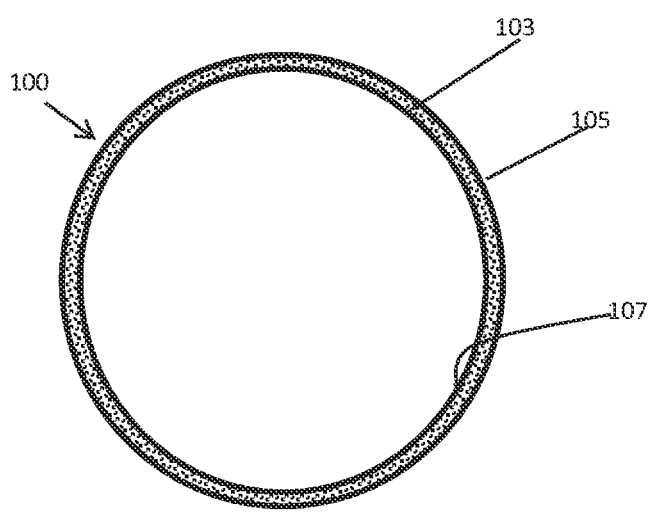
FIG. 1 is an illustration of a top down view of a coffee cup insulator sleeve according to the present disclosure.

Reference will now be made in detail to embodiments of the present invention, examples of which are illustrated in the accompanying drawings, wherein like reference numerals refer to the like elements throughout. The embodiments are described below to explain the present invention by referring to the figures.

Although the following text sets forth a detailed description of at least one embodiment or implementation, it is to be understood that the legal scope of protection of this application is defined by the words of the claims set forth at the end of this disclosure. The detailed description is to be construed as exemplary only and does not describe every possible embodiment since describing every possible embodiment would be impractical, if not impossible. Numerous alternative embodiments and/or implementations are both contemplated and possible, using either current technology or technology developed after the filing date of this patent, which would still fall within the scope of the claims It is to be understood that, unless a term is expressly defined in this application using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f).

FIG. 1 illustrates a top down view of a coffee cup insulator sleeve according to the present disclosure.

Referring to FIG. 1, an insulator sleeve 100 for holding a cup, such as the disposable paper or plastic cup, containing a hot beverage is formed of a biodegradable coffee ground amalgam 103. The insulator sleeve 100 is formed such that the insulator sleeve 100 has an outer surface 105 and an inner surface 107. The outer surface 105 is grasped by an individual drinking a hot beverage from a disposable paper or plastic cup. The inner surface 107 receives the disposable paper or plastic cup inserted therein.

The insulator sleeve 100 is formed of a biodegradable coffee ground amalgam produced by mixing coffee grounds optionally with the residue of the husking process (i.e., coffee silver film). This amalgam is compacted and the resulting compacted material is injected into a mold. To aid in the injection into the mold, the compacted material is maintained at 70% humidity. While the insulator sleeve 100 is shown, it will be understood that other objects, such as tray, tray covers, coasters and the like may be produced from this process.

The compacted material (i.e., coffee grounds, coffee silver film, plastic cups, plastic containers, cardboard cups, and/or cardboard containers for food) is inoculated with mycelium of any of a variety of species of mushrooms. The resulting molded coffee ground amalgam incubates at a temperature of 25° C. (i.e., 77° Fahrenheit) for a period of eight days. After the incubation period, the molded coffee ground amalgam is heated to a temperature of 55-66° C. to remove any humidity from the resulting product. Any of the many cafeteria residues, such as plastic cups, plastic containers, cardboard cups, and cardboard containers for food may be mixed with one or both of the other residues, coffee grounds and or coffee silver film.

The resulting insulator sleeve 100 is then polished to provide a shiny appearance and submerged in yucca starch and dried.

Figure 2:
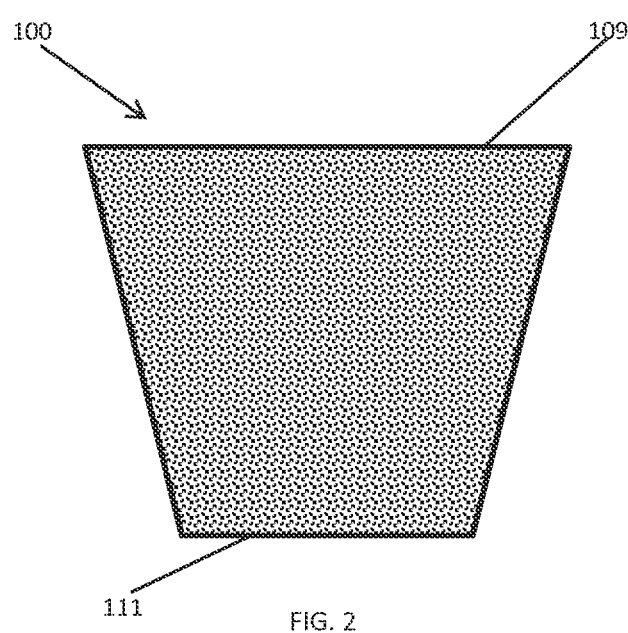
FIG. 2 is an illustration of a side view of a coffee cup insulator sleeve according to the present disclosure.

FIG. 2 illustrates a side view of a coffee cup insulator sleeve according to the present disclosure.

Referring to FIG. 2, the insulator sleeve 100 is oriented vertically with a top surface 109 and a bottom surface 111. It will be understood that the top surface 109 of the insulator sleeve 100 receives the disposable paper or plastic cup while the bottom surface 111 restrains the disposable paper or plastic cup from passing beyond the point where the diameter of the disposable paper or plastic cup equals the diameter of the bottom surface 111. Alternatively, or mutually, the top surface 109 or the inner surface 107 as in FIG. 1 provide the same function of arresting the disposable paper or plastic cup from passing beyond the point where the diameter of the disposable paper or plastic cup equals the diameter of the top surface 109 or the inner surface 107 of the insulator sleeve 100.

Figure 3:
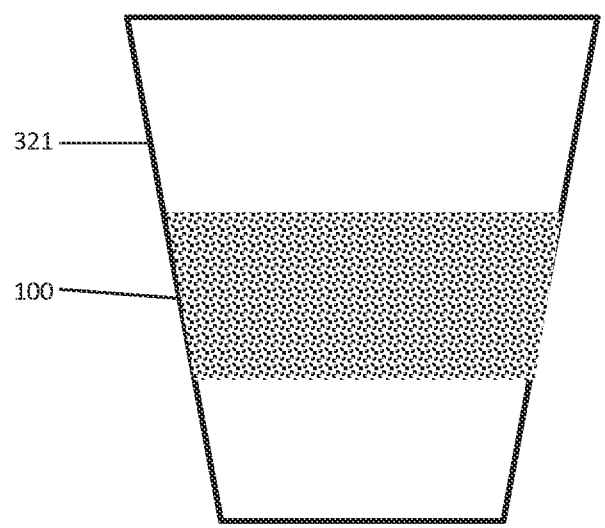
FIG. 3 is an illustration of a side view of a coffee cup with a coffee cup insulator sleeve according to the present disclosure.

FIG. 3 illustrates a side view of a disposable cup with a coffee cup insulator sleeve according to the present disclosure.

Referring to FIG. 3, a disposable cup 321 is inserted into the insulator sleeve 100. As discussed above, the inner surface 107, as in FIG. 1, restrains the disposable cup 321 from passing beyond a point where the diameter of the inner surface 107 equals the diameter of disposable cup 321. Once the disposable cup 321 is restrained from passing beyond that point, friction keeps the insulator sleeve 100 from sliding down the outer surface of the disposable cup 321. While the terms disposable cup 321 is used herein, any type of cup may be used provided a mold corresponding to the cup is available from producing the insulator sleeve 100.

Figure 4A:
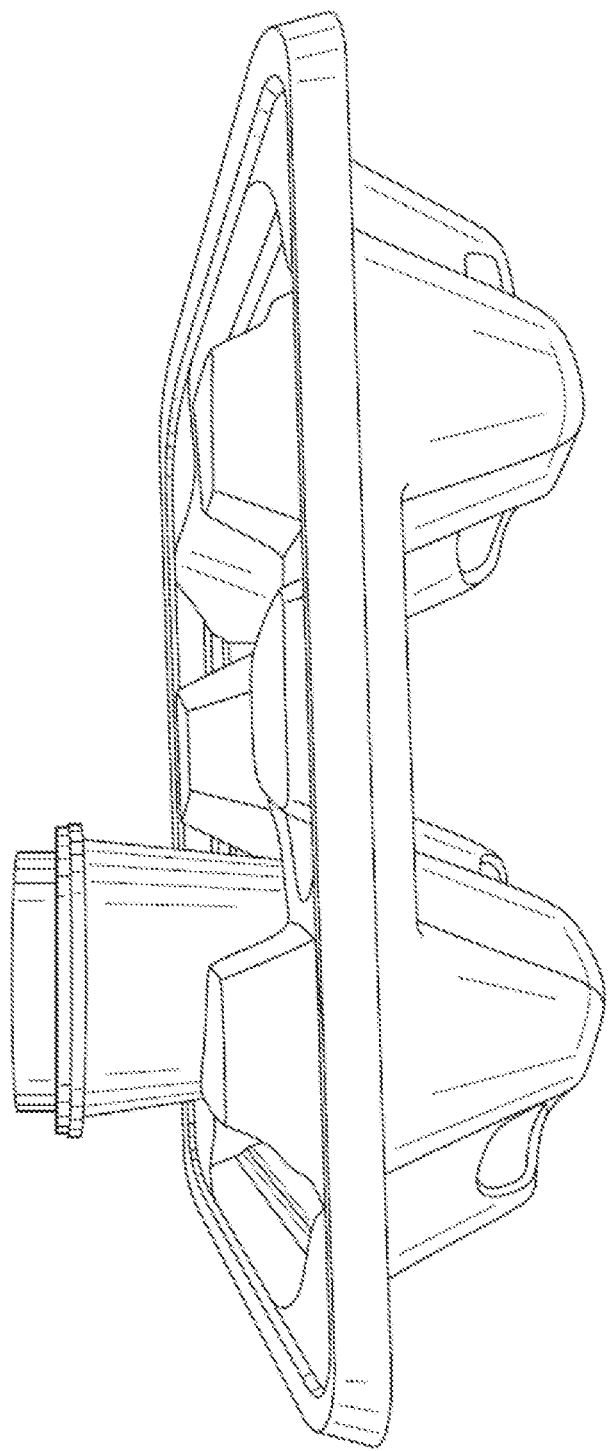
FIGS. 4A and 4B are illustrations of a coffee tray according to the present disclosure.

FIG. 4A illustrates of a side view of a coffee cup tray according to the present disclosure.

Figure 4B:
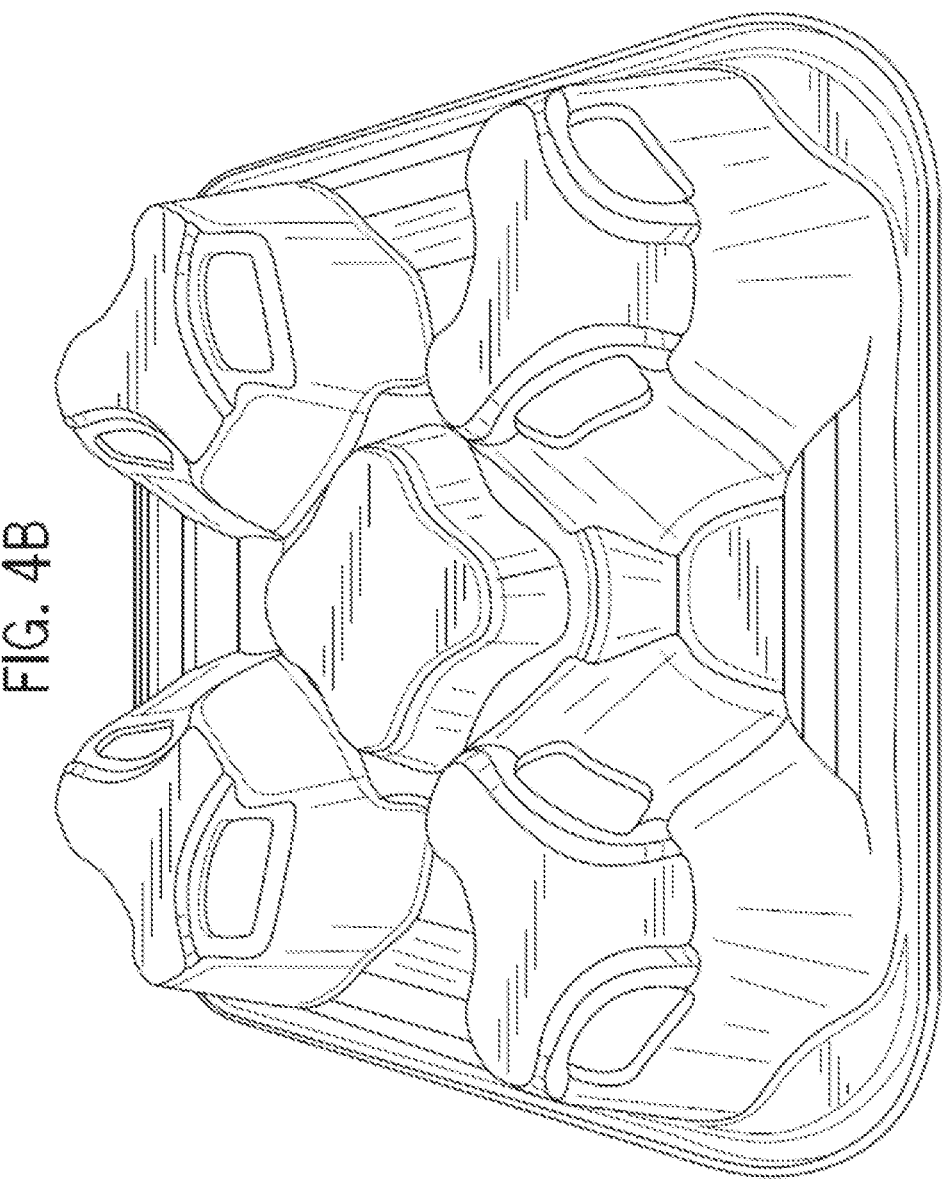

FIG. 4B illustrates of a bottom view of a tray according to the present disclosure.

Referring to FIGS. 4A and 4B, a tray formed of a biodegradable coffee ground amalgam produced by mixing coffee grounds optionally with the residue of the husking process (i.e., coffee silver film). This amalgam is compacted and the resulting compacted material is injected into a mold. The compacted material is inoculated with mycelium of any of a variety of species of mushrooms. The resulting molded coffee ground amalgam is incubated for a given time period. After the incubation period, the molded coffee ground amalgam is heated to remove any humidity from the resulting product. The resulting tray is then polished to provide a shiny appearance and submerged in yucca starch and dried.

While FIG. 1 provides an insulator sleeve 100 and FIGS. 4A and 4B provides a tray, it will be apparent to those skilled in the art that any product capable of being molded may replace the insulator sleeve 100 and tray 401.

Figure 5:
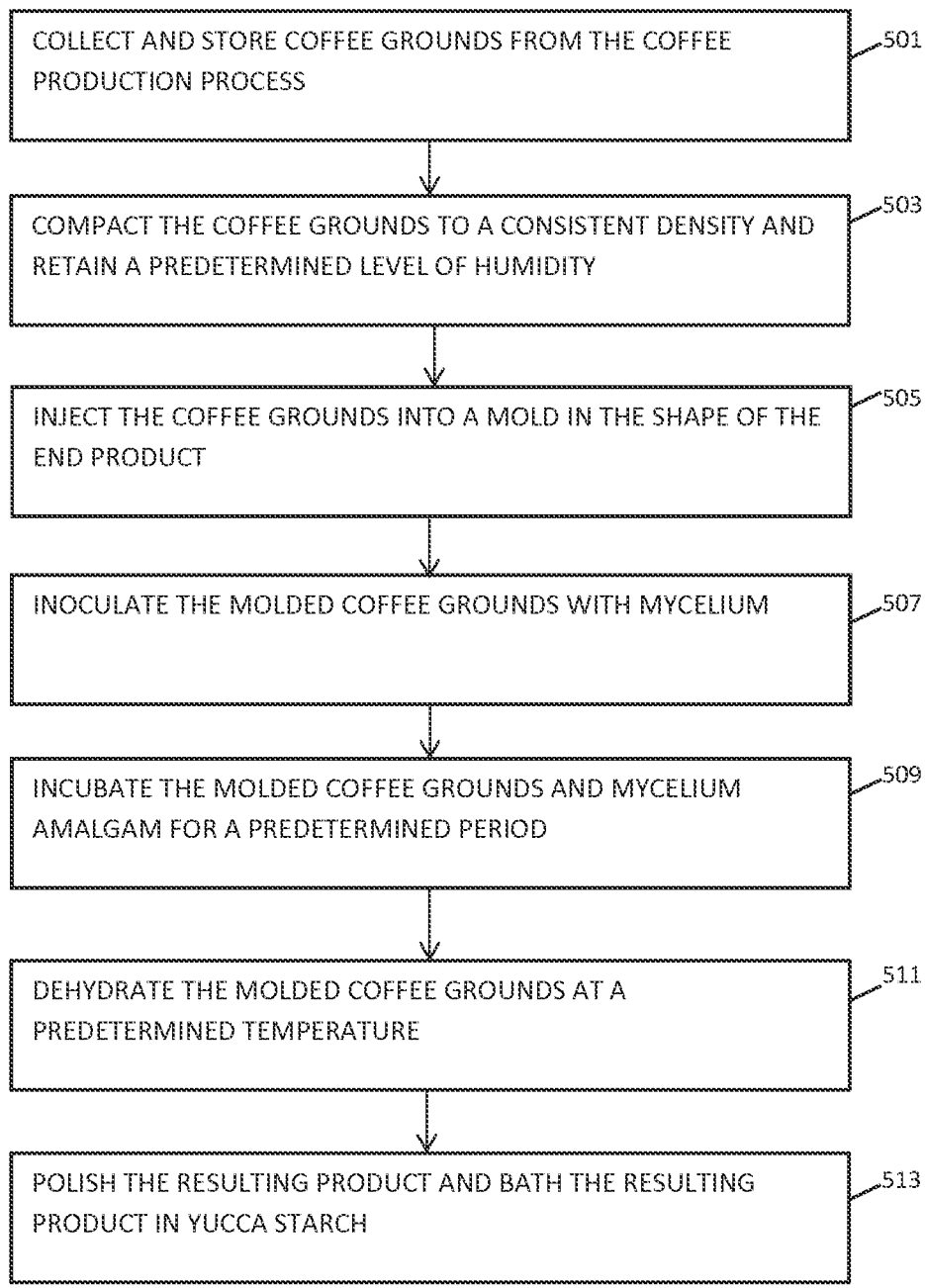
FIG. 5. is a flow diagram illustrating a method for producing a molded product according to an embodiment of the present disclosure.

FIG. 5 is a flow diagram illustrating a method for producing a food or beverage container according to an embodiment of the present disclosure.

Referring to FIG. 5, at operation 501, coffee grounds from the coffee production process are collected and held. It will be readily understood that coffee grounds are the residue of brewing coffee and while the grounds have some secondary uses in hair care and agriculture, the majority of coffee grounds are disposed of as trash where they are either buried in a landfill or incinerated.

At operation 503, the collected coffee grounds are compacted. It will be understood that the compacted coffee grounds should maintain a consistent humidity level of 70%. When the humidity exceeds 70% heat may be used to lower the humidity and when the humidity goes below 70% distilled water may added to increase the level of humidity. While a humidity level of 70% is disclosed herein, it will be understood that a larger range of humidity may be used depending on the coffee grounds, other elements added to an amalgam with the coffee grounds and the intended end product.

At operation 505, the collected coffee grounds are injected into a mold in the shape of a product to be produced. For purpose of this specification, an insulator sleeve has been chosen, but the specification is not limited thereto.

At operation 507, the molded coffee grounds, and/or silver film mixed with any of shredded plastic cups, plastic containers, cardboard cups, and cardboard containers for food, are inoculated with a mycelium. The mycelium may be any of the species of mushrooms including *Pleurotus* spp., *Ganoderma lucidum, corolius versicolor*, and *lentinula edodes*, but is not limited thereto. Mycelium has thread like properties and is used to hold and bond the molded coffee grounds. When the insulator sleeve 100 is disposed of, the mycelium aids in breaking down the coffee grounds as compost. Predetermined.

At operation 509, the molded amalgam of coffee grounds, and/or silver film mixed with any of shredded plastic cups, plastic containers, cardboard cups, and cardboard containers for food, and mycelium incubates for a period of time. According to a current embodiment that period is eight days. However, it will be understood that that period may change due to other conditions, including but not limited to the materials in an amalgam, such as the type of mycelium.

At operation 511, the molded amalgam of coffee grounds, and/or silver film mixed any of with shredded plastic cups, plastic containers, cardboard cups, and cardboard containers for food, and mycelium is dehydrated by the application of heat. Advantageously, the heat applied to dehydrate the molded amalgam of coffee grounds and mycelium is a range of 55-60° C. However, it will be understood that the temperature may be changed due to other conditions, including but not limited to the materials in an amalgam and the purpose of the end product.

At operation 513, optionally the molded amalgam of coffee grounds, and/or silver film mixed with any of shredded plastic cups, plastic containers, cardboard cups, and cardboard containers for food, and mycelium is polished to give the end product a shiny surface, the resulting product is optionally bathed in yucca starch and dried.

Figure 6:
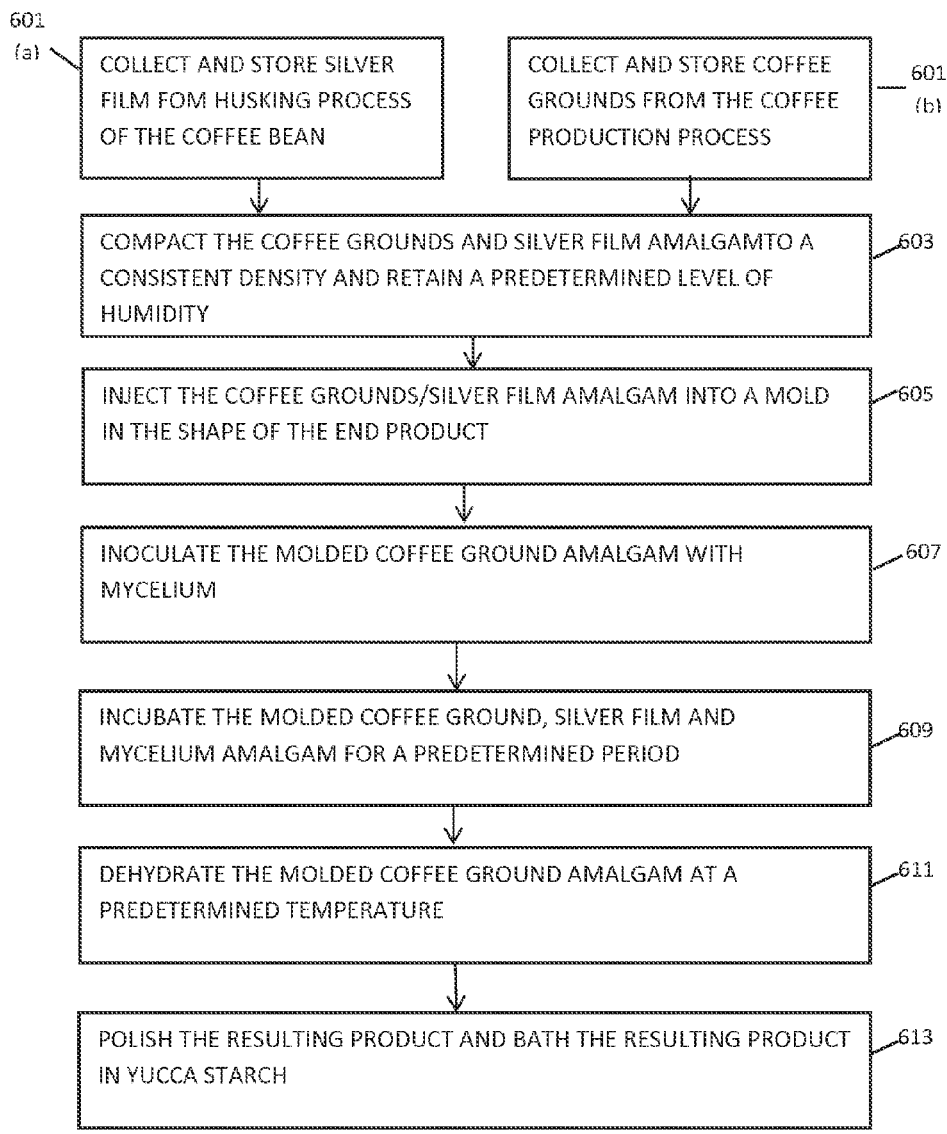
FIG. 6. is a flow diagram illustrating a method for producing molded product according to an embodiment of the present disclosure.

FIG. 6 is a flow diagram illustrating a method for producing a food or beverage container according to an embodiment of the present disclosure.

Referring to FIG. 6, at operation 601(*a*) collect and store silver film that is removed from the fruit of the coffee tree during the husking process.

At operation 601(*b*), coffee grounds from the coffee production process are collected and held. It will be readily understood that coffee grounds are the residue of brewing coffee and while the grounds have some secondary uses in hair care and agriculture, the majority of coffee grounds are disposed of as trash where they are either buried in a landfill or insinuated.

At operation 603, the collected coffee grounds and silver film, and/or silver film mixed with any of shredded plastic cups, plastic containers, cardboard cups, cardboard containers for food, are mixed and compacted into an amalgam. It will be understood that the compacted coffee ground amalgam should maintain a consistent humidity level of 70%. When the humidity exceeds 70% heat may be used to lower the humidity and when the humidity goes below 70% distilled water may added to increase the level of humidity. While a humidity level of 70% is disclosed herein, it will be understood that a larger range of humidity may be used depending on the coffee grounds, other elements added to an amalgam with the coffee grounds and the intended end product.

At operation 605, the collected coffee ground amalgam and/or silver film mixed with any of shredded plastic cups, plastic containers, cardboard cups, and cardboard containers for food, is injected into a mold in the shape of a product to be produced. For purpose of this specification, an insulator sleeve has been chosen, but the specification is not limited thereto.

At operation 607, the molded coffee ground amalgam and/or silver film mixed with any of shredded plastic cups, plastic containers, cardboard cups, and cardboard containers for food is injected with a mycelium. The mycelium may be any of the species of mushrooms including *Pleurotus* spp., *Ganoderma lucidum, corolius versicolor*, and *lentinula edodes*, but is not limited thereto. Mycelium has thread like properties and is used to hold and bond the molded coffee grounds. When the insulator sleeve 100 is disposed of, the mycelium aids in breaking down the coffee grounds as compost.

At operation 609, the molded amalgam of coffee ground, silver film and mycelium incubates for a period of time. According to a current embodiment that period is eight days. However, it will be understood that the period may be changed due to other conditions, including but not limited to the materials in an amalgam, such as the type of mycelium.

At operation 611, the molded amalgam of coffee ground, silver film and/or silver film mixed with shredded plastic cups, plastic containers, cardboard cups, and cardboard containers for food and mycelium is dehydrated by the application of heat. Advantageously, the heat applied to dehydrate the molded amalgam of coffee grounds and mycelium is a range of 55-60° C. However, it will be understood that that temperature may change due to other conditions, including but not limited to the materials in an amalgam and the purpose of the end product.

At operation 613, optionally the molded amalgam of coffee ground, silver film and/or silver film mixed with shredded plastic cups, plastic containers, cardboard cups, and cardboard containers for food and mycelium is polished to give the end product a shiny surface, the resulting product is optionally bathed in yucca starch and dried.

Examples of various features/aspects/components/operations have been provided to facilitate understanding of the disclosed embodiments of the present invention. In addition, various preferences have been discussed to facilitate understanding of the disclosed embodiments of the present invention. It is to be understood that all examples and preferences disclosed herein are intended to be non-limiting.

Although selected embodiments of the present invention have been shown and described individually, it is to be understood that at least aspects of the described embodiments may be combined.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

I claim:

1. A method for producing a recyclable molded product, the method comprising:
   injecting a coffee ground amalgam into a mold, the coffee ground amalgam comprising at least coffee grounds as a residue of the coffee brewing process;
   injecting the coffee ground amalgam with a mycelium;
   incubating the molded coffee ground amalgam injected with the mycelium for a period of time; and
   dehydrating the molded coffee ground amalgam injected with the mycelium at a set temperature.

2. The method of claim 1, further comprising:
polishing the external surface of the molded coffee ground amalgam.

3. The method of claim 2, further comprising:
bathing the dehydrated coffee ground amalgam in a starch; and
drying the starched dehydrated coffee ground amalgam.

4. The method of claim 1, wherein the coffee ground amalgam includes coffee grounds of a uniform size.

5. The method of claim 1, wherein the coffee ground amalgam further includes coffee silver film.

6. The method of claim 1, wherein recyclable molded product is any of a cup insulator sleeve, a tray, a tray cover, and a coaster.

7. The method of claim 1, wherein the mold is in the form of the exterior surface of a disposable coffee cup.

8. A method for producing a biodegradable cup insulator, the method comprising:
collecting coffee grounds as the residue of the coffee brewing process;
compacting the coffee grounds to a predetermined density while maintaining a predetermined humidity level;
injecting the compacted coffee grounds into a mold in the shape of a portion of an exterior of a cup;
inoculating the compacted coffee grounds in the mold with a mycelium;
incubating the compacted coffee grounds in the mold inoculated with the mycelium for a predetermined period of time; and
dehydrating the compacted coffee grounds in the mold inoculated with the mycelium at a predetermined temperature.

9. The method of claim 8, further comprising:
collecting silver film as a residue of the coffee fruit husking process; and
mixing the collecting silver film with the coffee grounds prior to compacting the coffee grounds.

10. The method of claim 8, wherein the predetermined humidity level is seventy percent.

11. The method of claim 8, wherein the mycelium is at least one of *Pleurotus* spp., *Ganoderma lucidum, corolius versicolor* and *lentinula edodes*.

12. The method of claim 8, wherein the predetermined temperature is in the range of 55° C. to 60° C.

13. The method of claim 8, further comprising:
polishing the exterior of the biodegradable cup insulator.

14. The method of claim 12, further comprising:
bathing the biodegradable cup insulator in *yucca* starch.

15. A method for producing a biodegradable cup insulator, the method comprising:
collecting coffee grounds as the residue of the coffee brewing process;
compacting the coffee grounds to a predetermined density while maintaining a predetermined humidity level;
injecting the compacted coffee grounds into a mold in the shape of a portion of an exterior of a cup;
inoculating the compacted coffee grounds in the mold with a mycelium; and
incubating the compacted coffee grounds in the mold inoculated with the mycelium for a predetermined period of time.

* * * * *